United States Patent
Cui et al.

(10) Patent No.: US 12,276,491 B1
(45) Date of Patent: Apr. 15, 2025

(54) DEVICE FOR MEASURING DIAMETER ERROR OF ROLLER FOR THREADED PAIR TRANSMISSION

(71) Applicant: Shanghai Jiao Tong University, Shanghai (CN)

(72) Inventors: Yi Cui, Shanghai (CN); Mingcai Xing, Shanghai (CN); Shuo Liu, Shanghai (CN); Yan Fu, Shanghai (CN); Meng Zhang, Shanghai (CN)

(73) Assignee: Shanhai Jiao Tong University, Shanghai (CN)

( * ) Notice: Subject to any disclaimer, the term of this patent is extended or adjusted under 35 U.S.C. 154(b) by 0 days.

(21) Appl. No.: 18/958,180

(22) Filed: Nov. 25, 2024

(30) Foreign Application Priority Data

Jan. 2, 2024 (CN) .......................... 202410001316.6

(51) Int. Cl.
*G01B 11/08* (2006.01)
*G01B 9/02* (2022.01)

(52) U.S. Cl.
CPC .......... *G01B 11/08* (2013.01); *G01B 9/02049* (2013.01)

(58) Field of Classification Search
CPC ............................ G01B 11/08; G01B 9/02049
See application file for complete search history.

(56) References Cited

FOREIGN PATENT DOCUMENTS

CN          101701798 A          5/2010

OTHER PUBLICATIONS

Yongchang Lv, Yigao Miao. Discussion on the Measurement Control and Data Processing of the Ball Screw Dynamic Characteristics. Modern manufacturing technology and equipment. 2018, the first issue, p. 43-44.

*Primary Examiner* — Rebecca C Bryant
(74) *Attorney, Agent, or Firm* — Woodard, Emhardt, Henry, Reeves & Wagner, LLP

(57) ABSTRACT

A device for measuring a diameter error of a roller for threaded pair transmission in the technical field of power machinery, comprising a roller fixing device, a laser measuring device, a screw driving device, and a roller to be measured. The roller fixing device comprises a fixing rod, a supporting structure, guide rails, nut-bolt pairs and a fixing beam, to fix the roller. The laser measuring device comprises pressing columns, laser sensors, laser receiving plates, laser sensor placement plates and moving structures, which ensure the verticality of the roller. The screw driving device comprises ball screw pairs, bearings, nuts, nut connecting bolts and cranks, to drive the moving structures to ensure the distance between the laser measuring device and the roller. The roller diameter error measuring device of the present disclosure is simple to operate, has fewer human influence factors, and has high measurement accuracy.

6 Claims, 4 Drawing Sheets

DEVICE FOR MEASURING DIAMETER ERROR OF ROLLER FOR THREADED PAIR TRANSMISSION

FIELD OF THE DISCLOSURE

The disclosure relates to a measuring device in the technical field of power machinery technology, especially a device for measuring a diameter error of a roller for threaded pair transmission.

BACKGROUND

Planetary roller screw is a new type of threaded pair transmission device, including a screw, multiple rollers, a nut, an inner gear ring and carrier, which is widely used in high-end equipment such as aviation equipments, navigation equipments and humanoid robots. During the manufacturing, it is inevitable that the rollers have diameter errors. The roller diameter errors can severely affect the uniformity of the multi-rollers load sharing of a planetary roller screw as shown in FIG. 1. This will seriously affect the operational stability of the planetary roller screw, causing the significant wear and premature failure of some rollers, greatly reducing the service performance and lifespan of the entire planetary roller screw structure. It can be seen that the consistency of the diameter error among multiple rollers is one of the ways to improve its overall service performance and lifespan. In order to improve the consistency of the diameter errors among multiple rollers, it is essential to accurately measure the diameter error of each roller. However, there is a lack of devices that can accurately measure the roller diameter error. Therefore, it is of great significance to design a roller diameter error measurement device suitable for threaded pair transmission systems.

SUMMARY OF THE INVENTION

In view of the deficiencies of existing technologies, the present disclosure proposes a device for measuring diameter error of a roller for threaded pair transmission. This device significantly reduces human factors, and can accurately measure the roller diameter error. This invention also can provide the data support and guarantee for selecting multiple rollers with consistent diameter errors for planetary roller screws.

The present disclosure is achieved by the following technical solution, which comprises a roller fixing device, a laser measuring device, a screw driving device, and a roller to be measured; wherein the roller fixing device comprises a support device, a fixing rod, a fixing beam, a first locking nut-bolt pair, a second locking nut-bolt pair, wherein the support device comprises first guide rails, second guide rails, side wall bearing mounting holes of bearing on side wall, a longitudinal beam, and a roller fixing hole, and the longitudinal beam is arranged at a top middle part position of the support device, and, two first guide rails and two second guide rails are arranged at the top of the support device, and two first guide rails are arranged on one side of the longitudinal beam, and two second guide rails are arranged on another side of the longitudinal beam, and the first guide rails and the second guide rails are symmetrically arranged along the longitudinal beam, and two side wall bearing mounting holes of bearing on side wall are respectively provided on two side walls of the support device; and the roller fixing hole is arranged on the longitudinal beam; and a bottom of the fixing rod is fixedly connected to the support device, and the first locking nut-bolt pair and the second locking nut-bolt pair are respectively arranged at two ends of the fixing beam, and the fixing beam is arranged on the fixing rod by the first locking nut-bolt pair; and the laser measuring device comprises first moving devices, second moving devices, a first laser sensor placement plate, a second laser sensor placement plate, a first laser sensor, a first pressing-resistant column, a second laser receiving plate, a first laser receiving plate, a second pressing column, a second laser sensor, wherein bottoms of two ends of the first laser sensor placement plate are fixedly connected to tops of two first moving devices respectively, and bottoms of two ends of the second laser sensor placement plate are fixedly connected to tops of two second moving devices respectively, and the first laser sensor, the first pressing column, and the second laser receiving plate are arranged in sequence at the first laser sensor placement plate, and the first laser receiving plate, the second pressing column, and the second laser sensor are arranged in sequence at the second laser sensor placement plate, and the first laser sensor matches with the first laser receiving plate, and the first pressing column matches with the second pressing column, and the second laser sensor matches with the second laser receiving plate, and the two first moving devices are respectively arranged on the two first guide rails, and the two second moving devices are respectively arranged on the two second guide rails; and the screw driving device comprises a first ball screw pair, a first crank, a first bearing, a first nut, a first bolt mounting plate, a first nut connecting bolt, a second bearing, a second ball screw pair, a second crank, a third bearing, a second nut, a second bolt mounting plate, a second nut connecting bolt, a fourth bearing, wherein the first crank and the second bearing are respectively arranged at two ends of the first ball screw pair, and the first ball screw pair passes through the first bearing and the first nut, and the first bolt mounting plate is fixedly connected to the first nut; and the second crank and the fourth bearing are respectively arranged at two ends of the second ball screw pair, and the second ball screw pair passes through the third bearing and the second nut, and the second bolt mounting plate is fixedly connected to the second nut; and a top of the roller to be measured is connected to the fixing beam by the second locking nut-bolt pair, and a bottom of the roller to be measured is arranged in the roller fixing hole, and the first pressing-resistant column and the second pressing-resistant column are both in contact with the roller to be measured, and the first bearing and the third bearing are respectively embedded in the two side wall bearing mounting holes of bearing on side wall, and the second bearing and the fourth bearing are both embedded in a bearing mounting hole on the longitudinal beam, and the first bolt mounting plate is fixedly connected to a lower disc of the first laser sensor placement plate through the first nut connecting bolt, and the second bolt mounting plate is fixedly connected to a lower disc of the second laser sensor placement plate by the second nut connecting bolt.

Further, in the present application, the two bearing mounting holes of bearing on side wall are both arranged at a middle position between two guide rails on a same side, and the roller fixing hole is arranged at a middle position of the longitudinal beam, and the entire support device is an integrated structure.

Further, in the present application, the first guide rails and the first moving devices, and the second guide rails and the second moving devices are respectively matched together through a concave-convex structure.

Further, in the present application, the first crank and the second crank are respectively provided with a crank handle, and the first ball screw pair and the second ball screw pair are coaxially arranged.

Further, in the present application, the first ball screw pair and the second ball screw pair both have a cylindrical boss structure, wherein a boss of the first ball screw pair is arranged at the first bearing, and a boss of the second ball screw pair is arranged at the third bearing.

Further, in the present application, the first laser sensor, the first pressing column, the second laser receiving plate, the first laser receiving plate, the second pressing column, and the second laser sensor are arranged at a same height.

Compared with the existing technologies, the advantages of the present invention are as follows: the present invention has a reasonable configuration and simple structure, significantly reducing human factors and accurately measuring the roller diameter error. It can provide the enhanced data support for ensuring the diameter error consistency among multiple rollers in planetary roller screws, which is of great significance in improving the operation stability and service life of planetary roller screws.

Wherein, 1. support device, 2. fixing rod, 3. fixing beam, 4. first locking nut-bolt pair, 5. second locking nut-bolt pair, 6. first moving device, 7. second moving device, 8. first laser sensor placement plate, 9. second laser sensor placement plate, 10. first laser sensor, 11. first pressing-resistant column, 12. second laser receiving plate, 13. first laser receiving plate, 14. second pressing-resistant column, 15. second laser sensor, 16. roller to be measured, 17. first ball screw pair, 18. first crank, 19. first bearing, 20. first nut, 21. first bolt mounting plate, 22. first nut connecting bolt, 23. second bearing, 24. second ball screw pair, 25. second crank, 26. third bearing, 27. second nut, 28. second bolt mounting plate, 29. second nut connecting bolt, 30. fourth bearing, 101. first guide rail, 102. second guide rail, 103. mounting hole of bearing on side wall, 104. longitudinal beam, 105. roller fixing hole.

DESCRIPTION OF THE ILLUSTRATED EMBODIMENTS

The following is a detailed description of an embodiment of the present disclosure in conjunction with the accompanying drawings. This embodiment is based on the technical solution of the present disclosure, and provides a detailed implementation method and a specific operation process. However, the protection scope of the present disclosure is not limited to the following embodiment.

Embodiment 1

Figure 1:
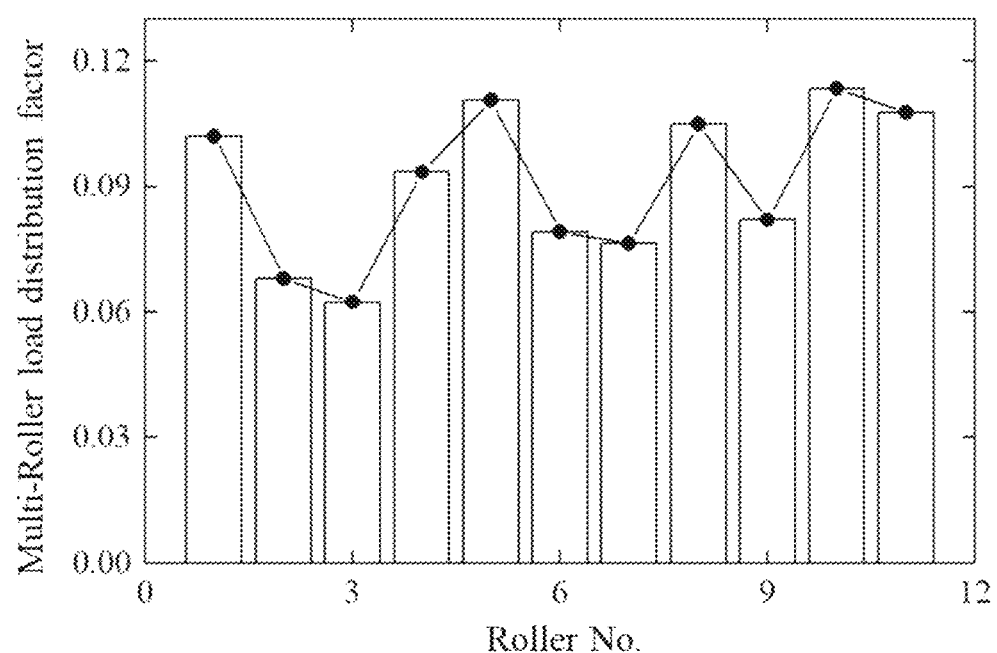
FIG. 1 shows the relationship between the roller diameter error and the uniformity of load sharing among multiple rollers.
Figure 2:
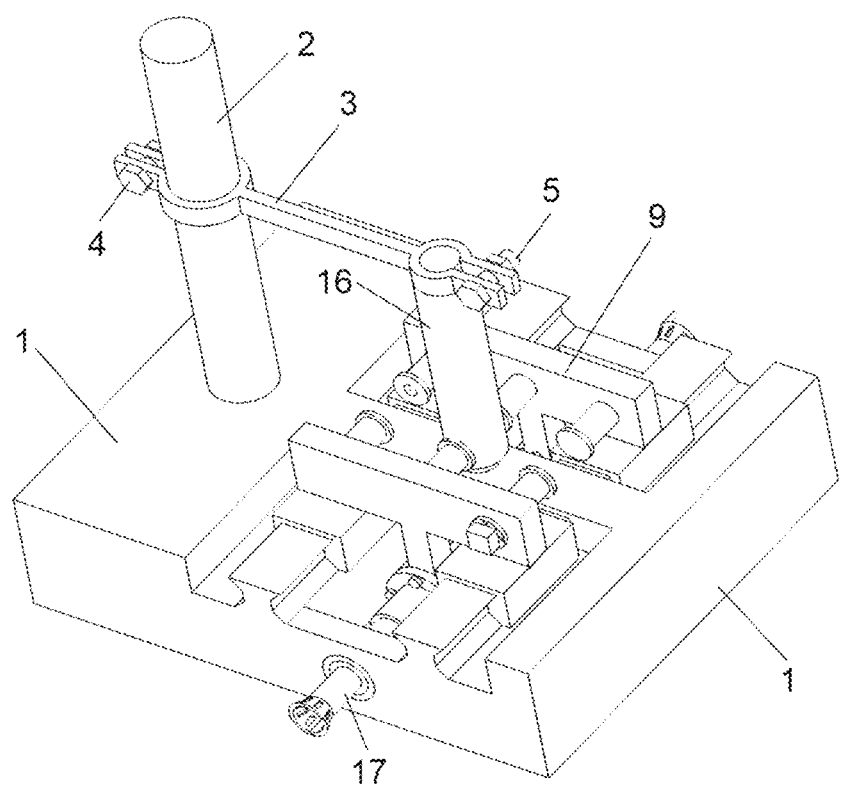
FIG. 2 is the schematic diagram of an overall structure of an embodiment of the present invention.
Figure 3:
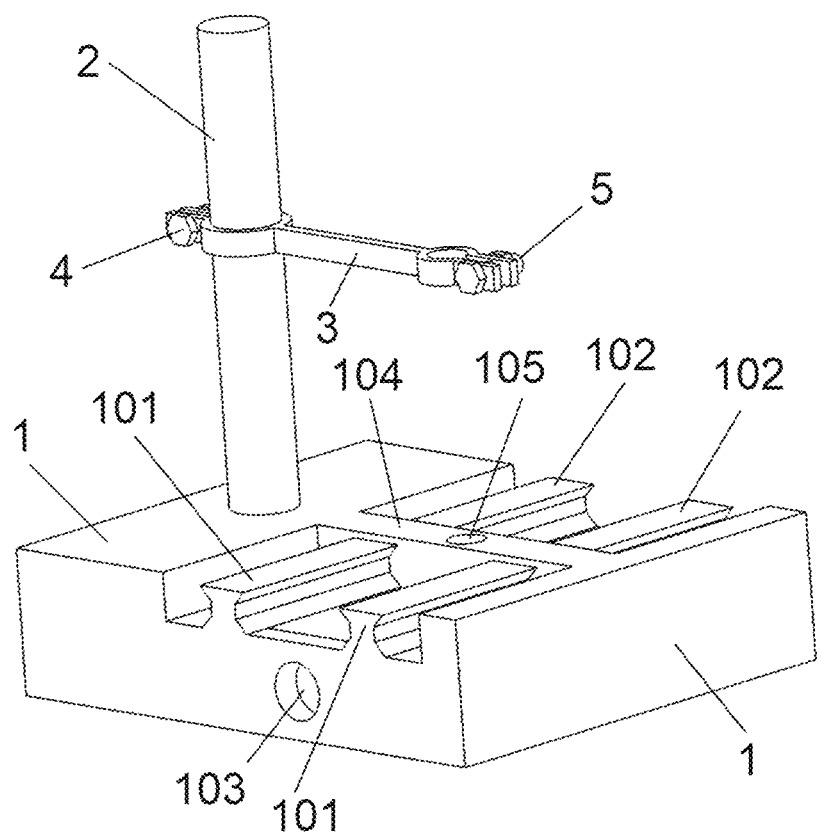
FIG. 3 is a schematic diagram of the structure of roller fixing device in an embodiment of the present invention.
Figure 4:
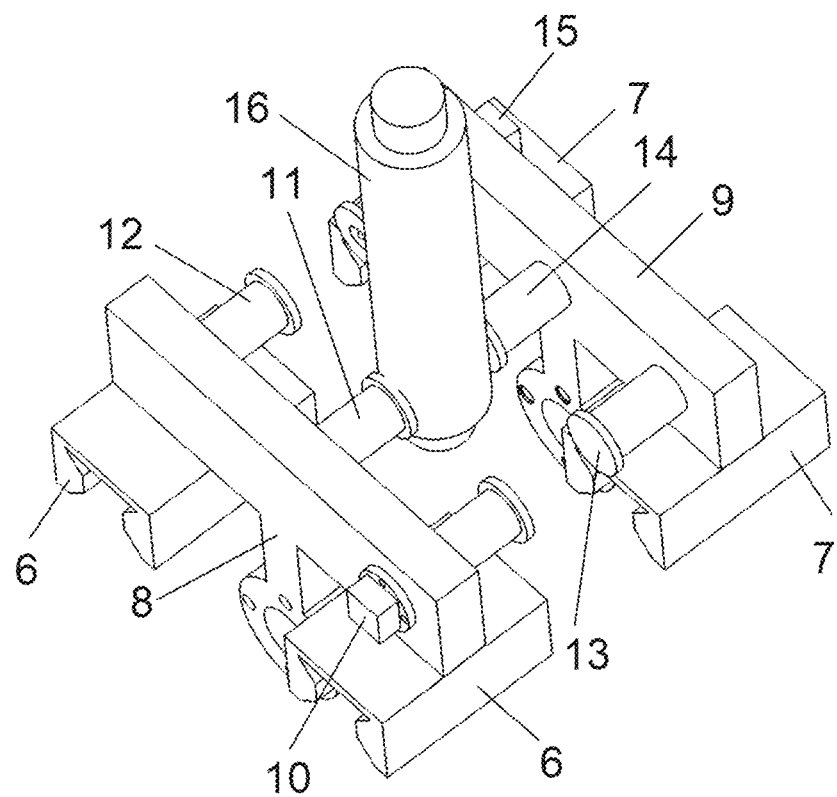
FIG. 4 is a schematic diagram of the structure of the laser measuring device in an embodiment of the present invention.
Figure 5:
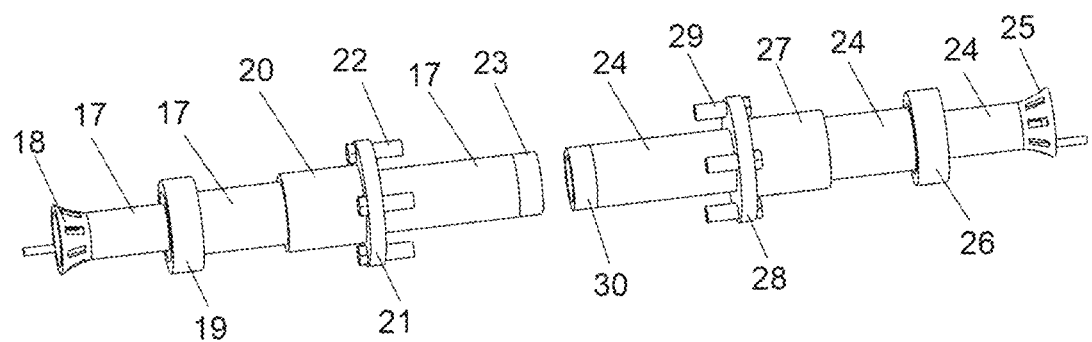
FIG. 5 is a schematic diagram of the structure of the screw driving device in an embodiment of the present invention.

The structure of the present disclosure is shown in FIG. 2 to FIG. 5. The present disclosure comprises a roller fixing device, a laser measuring device, a screw driving device, and a roller to be measured 16. The roller fixing device comprises a support device 1, a fixing rod 2, a fixing beam 3, a first locking nut-bolt pair 4, and a second locking nut-bolt pair 5.

The support device 1 comprises first guide rail 101, second guide rail 102, mounting holes of bearing on side wall 103, a longitudinal beam 104, and a roller fixing hole 105. The longitudinal beam 104 is arranged at the top middle position of the support device 1. Two first guide rails 101 and two second guide rails 102 are all arranged at a top of the support device 1. The two first guide rails 101 are arranged on one side of the longitudinal beam 104, and the two second guide rails 102 are arranged on another side of the longitudinal beam 104. The first guide rail 101 and the second guide rail 102 are symmetrically arranged along the longitudinal beam 104.

Two mounting holes of bearing on side wall 103 are respectively arranged on two side walls of the support device 1. One mounting hole of bearing on side wall 103 is arranged at a middle position between the two first guide rails 101, and the mounting hole of bearing on other side wall 103 is arranged at a middle position between the two second guide rails 102. The roller fixing hole 105 is arranged in a middle part of the longitudinal beam 104, and the entire support device 1 is an integrated structure. The bottom of the fixing rod 2 is fixedly connected to the support device 1, and the first locking nut-bolt pair 4 and the second locking nut-bolt pair 5 are respectively arranged at two ends of the fixing beam 3, and the fixing beam 3 is arranged on the fixing rod 2 by the first locking nut-bolt pair 4.

The laser measuring device comprises a first moving device 6, a second moving device 7, a first laser sensor placement plate 8, a second laser sensor placement plate 9, a first laser sensor 10, a first pressing-resistant column 11, a second laser receiving plate 12, a first laser receiving plate 13, a second pressing column 14, and a second laser sensor 15. Bottoms of both ends of the first laser sensor placement plate 8 are respectively fixedly connected to tops of the two first moving devices 6, and bottoms of both ends of the second laser sensor placement plate 9 are respectively fixedly connected to tops of the two second moving devices 7.

The first laser sensor 10, the first pressing-resistant column 11, and the second laser receiving plate 12 are sequentially arranged on the first laser sensor placement plate 8. The first laser receiving plate 13, the second pressing column 14, and the second laser sensor 15 are sequentially arranged on the second laser sensor placement plate 9. The first laser sensor 10 matches the first laser receiving plate 13. The first pressing-resistant column 11 matches the second pressing-resistant column 14, and the second laser sensor 15 matches the second laser receiving plate 12. The two first moving devices 6 are respectively arranged on the two first guide rails 101, and the two second moving devices 7 are respectively arranged on the two second guide rails 102. The first guide rails 101 and the first moving devices 6 are matched together through a concave-convex structure. Similarly, the second guide rails 102 and the second moving devices 7 are matched together through a concave-convex structure. The first moving devices 6 can slide on the first guide rail 101, and the second moving devices 7 can slide on the second guide rail 102.

The first laser sensor 10, the first pressing column 11, the second laser receiving plate 12, the first laser receiving plate 13, the second pressing column 14, and the second laser sensor 15 are arranged at a same height. The screw driving device includes a first ball screw pair 17, a first crank 18, a first bearing 19, a first nut 20, a first bolt mounting plate 21, a first nut connecting bolt 22, a second bearing 23, a second ball screw pair 24, a second crank 25, a third bearing 26, a second nut 27, a second bolt mounting plate 28, a second nut connecting bolt 29, and a fourth bearing 30. The first crank 18 and the second bearing 23 are respectively arranged at two ends of the first ball screw pair 17, and the first ball screw pair 17 passes through the first bearing 19 and the first nut 20, and the first bolt mounting plate 21 is fixedly connected to the first nut 20. The second crank 25 and the fourth bearing 30 are respectively arranged at two ends of the second ball screw pair 24, and the second ball screw pair 24 passes through the third bearing 26 and the second nut 27.

The second bolt mounting plate 28 and the second nut 27 are fixedly connected together. The first ball screw pair 17 and the second ball screw pair 24 both have a cylindrical boss structure. The boss of the first ball screw pair 17 is arranged at the first bearing 19, and the boss of the second ball screw pair 24 is arranged at the third bearing 26. The first nut 20 is arranged between the first bearing 19 and the second bearing 23, and the second nut 27 is arranged between the third bearing 26 and the fourth bearing 30. The top of the roller to be measured 16 is connected to the fixed beam 3 by the second locking nut-bolt pair 5, and the bottom of the roller to be measured 16 is arranged in the roller fixing hole 105.

The first pressing-resistant column 11 and the second pressing-resistant column 14 are both in contact with the roller to be measured 16. The first bearing 19 and the third bearing 26 are respectively embedded in the mounting holes of bearing on the two side wall 103. The second bearing 23 and the fourth bearing 30 are both embedded in a bearing mounting hole on the longitudinal beam 104. The first bolt mounting plate 21 is fixedly connected to a lower disk at the bottom of the first laser sensor placement plate 8 through the first nut connecting bolt 22, and the second bolt mounting plate 28 is fixedly connected to a lower disk at the bottom of the second laser sensor placement plate 9 through the second nut connecting bolt 29. The first crank 18 and the second crank 25 are both provided with a crank handle, and the first ball screw pair 17 and the second ball screw pair 24 are coaxially arranged.

In the implementation of the present disclosure, the roller fixing device is used to fix the roller to be measured 16. The fixing rod 2 is fixed in the support structure, and one end of the fixing beam 3 is connected to the fixing rod 2, and the other end is connected to the roller to be measured 16. By adjusting the locking nut-bolt pair, the fixing beam 3 can be moved up and down along the fixing rod 2 to adapt to rollers of different lengths and diameters to measure their diameter errors.

The screw driving device is used to drive the first moving devices 6 and the second moving devices 7 to ensure the distance between the laser measuring device and the roller to be measured 16. The two ball screw pairs are rotated by manually rotating the first crank 18 and the second crank 25 before and after the measuring device, driving the two nuts to move forward and backward. The two laser sensor placement plates are respectively connected to the two nuts in the two roller screw pairs through nut connecting bolts, so that the first moving devices 6 and the second moving devices 7 move forward and backward along the guide rails. The guide rails ensure the straightness of the forward and backward movement of the first moving devices 6, the second moving devices 7 and the laser sensor placement plates.

The laser measuring device is used to ensure the verticality of the roller to be measured 16 and the fixed beam 3, and also used to measure the roller diameter error value. The pressing-resistant columns, laser sensors and laser receiving plates in the laser measuring device are of a same height, and are all arranged on the laser sensor placement plates. The laser sensor placement plates are connected to the moving device. The laser sensor placement plates move forward and backward with the moving structure. The pressing-resistant columns are used to approach the front and rear thread top surfaces of the roller to be measured, and to fix the roller to be measured. The distances $l_1$ and $l_2$ between the laser sensors and the laser receiving plates respectively are measured according to the laser sensors placed on both sides of the laser sensor placement plate. According to the measured distances $l_1$ and $l_2$, the measured roller diameter error can be expressed as:

$$e_r = \frac{(l_1 - d_r) + (l_2 - d_r)}{2} \qquad (1)$$

where, $e_r$ is the roller diameter error; and $d_r$ is the theoretical roller diameter.

The above embodiment is merely illustrative of the principles and uses of the present disclosure, and is not intended to limit the present disclosure. Anyone familiar with the technology may modify or change the above embodiment without violating the spirit and scope of the present disclosure. Therefore, all equivalent modifications or changes made by those with ordinary knowledge in the technical field without departing from the spirit and technical ideas disclosed by the present disclosure should still be covered by the claims of the present disclosure.

The invention claimed is:

1. A device for measuring a diameter error of a roller for threaded pair transmission, characterized by comprising a roller fixing device, a laser measuring device, a screw driving device, and a roller to be measured (16); wherein
the roller fixing device comprises a support device (1), a fixing rod (2), a fixing beam (3), a first locking nut-bolt pair (4), a second locking nut-bolt pair (5), wherein the support device (1) comprises first guide rails (101), second guide rails (102), mounting holes of bearing on side wall (103), a longitudinal beam (104), and a roller fixing hole (105), and the longitudinal beam (104) is arranged at a top middle position of the support device (1), two first guide rails (101) and two second guide rails (102) are arranged at the top of the support device (1), and two first guide rails (101) are arranged on one side of the longitudinal beam (104), and two second guide rails (102) are arranged on another side of the longitudinal beam (104), and the first guide rails (101) and the second guide rails (102) are symmetrically arranged along the longitudinal beam (104), and two mounting holes of bearing on side wall (103) are respectively provided on two side walls of the support device (1); and the roller fixing hole (105) is arranged on the longitudinal beam (104); and a bottom of the fixing rod (2) is fixedly connected to the support device (1), and the first locking nut-bolt pair (4) and the second locking nut-bolt pair (5) are respectively arranged at two ends of the fixing beam (3), and the fixing beam (3) is arranged on the fixing rod (2) by the first locking nut-bolt pair (4); and the laser measuring device comprises first moving devices (6), second moving devices (7), a first laser sensor placement plate (8), a second laser sensor placement plate (9), a first laser sensor (10), a first pressing-resistant column (11), a second laser receiving plate (12), a first laser receiving plate (13), a second pressing column (14), a second laser sensor (15), wherein bottoms of two ends of the first laser sensor placement plate (8) are fixedly connected to tops of two first moving devices (6) respectively, and bottoms of two ends of the second laser sensor placement plate (9) are fixedly connected to tops of two second moving devices (7) respectively, and the first laser sensor (10), the first pressing column (11), and the second laser receiving plate (12) are arranged in sequence at the first laser sensor placement plate (8), and the first laser receiving plate (13), the second pressing column (14), and the second laser sensor (15) are arranged in sequence at the second laser sensor placement plate (9), and the first laser sensor (10) matches with the first laser receiving plate (13), and the first pressing column (11) matches with the second pressing column (14), and the second laser sensor (15) matches with the second laser receiving plate (12), and the two first moving devices (6) are respectively arranged on the two first guide rails (101), and the two second moving devices (7) are respectively arranged on the two second guide rails (102); and the screw driving device comprises a first ball screw pair (17), a first crank (18), a first bearing (19), a first nut (20), a first bolt mounting plate (21), a first nut connecting bolt (22), a second bearing (23), a second ball screw pair (24), a second crank (25), a third bearing (26), a second nut (27), a second bolt mounting plate (28), a second nut connecting bolt (29), a fourth bearing (30), wherein the first crank (18) and the second bearing (23) are respectively arranged at two ends of the first ball screw pair (17), and the first ball screw pair (17) passes through the first bearing (19) and the first nut (20), and the first bolt mounting plate (21) is fixedly connected to the first nut (20); and the second crank (25) and the fourth bearing (30) are respectively arranged at two ends of the second ball screw pair (24), and the second ball screw pair (24) passes through the third bearing (26) and the second nut (27), and the second bolt mounting plate (28) is fixedly connected to the second nut (27); and a top of the roller to be measured (16) is connected to the fixing beam (3) by the second locking nut-bolt pair (5), and a bottom of the roller to be measured (16) is arranged in the roller fixing hole (105), and the first pressing-resistant column (11) and the second pressing-resistant column (14) are both in contact with the roller to be measured (16), and the first bearing (19) and the third bearing (26) are respectively embedded in the two mounting holes of bearing on side wall (103), and the second bearing (23) and the fourth bearing (30) are both embedded in a bearing mounting hole on the longitudinal beam (104), and the first bolt mounting plate (21) is fixedly connected to a lower disc of the first laser sensor placement plate (8) through the first nut connecting bolt (22), and the second bolt mounting plate (28) is fixedly connected to a lower disc of the second laser sensor placement plate (9) by the second nut connecting bolt (29).

2. The device for measuring a diameter error of a roller for threaded pair transmission according to claim 1, characterized in that the two mounting holes of bearing on side wall bearing (103) are both arranged at a middle position between two guide rails on a same side, and the roller fixing hole (105) is arranged at a middle position of the longitudinal beam (104), and the entire support device (1) is an integrated structure.

3. The device for measuring a diameter error of a roller for threaded pair transmission according to claim 1, characterized in that the first guide rails (101) and the first moving devices (6), and the second guide rails (102) and the second moving devices (7) are respectively matched together through a concave-convex structure.

4. The device for measuring a diameter error of a roller for threaded pair transmission according to claim 1, characterized in that the first crank (18) and the second crank (25) are respectively provided with a crank handle, and the first ball screw pair (17) and the second ball screw pair (24) are coaxially arranged.

5. The device for measuring a diameter error of a roller for threaded pair transmission according to claim 1, characterized in that the first ball screw pair (17) and the second ball screw pair (24) both have a cylindrical boss structure, wherein a boss of the first ball screw pair (17) is arranged at the first bearing (19), and a boss of the second ball screw pair (24) is arranged at the third bearing (26).

6. The device for measuring a diameter error of a roller for threaded pair transmission according to claim 1, characterized in that the first laser sensor (10), the first pressing column (11), the second laser receiving plate (12), the first laser receiving plate (13), the second pressing column (14), and the second laser sensor (15) are arranged at a same height.

* * * * *